United States Patent [19]
Brannen

[11] Patent Number: 4,524,287
[45] Date of Patent: Jun. 18, 1985

[54] POST-COLLISION FIRE PREVENTION DEVICE

[76] Inventor: Wyley W. Brannen, P.O. Box 253, Statesboro, Ga. 30458

[21] Appl. No.: 573,415

[22] Filed: Jan. 24, 1984

[51] Int. Cl.³ ........................ H01H 35/14; B60Q 1/44
[52] U.S. Cl. .................................. 307/10 R; 307/121; 200/61.52; 200/61.45 R; 340/52 H; 180/283
[58] Field of Search ................. 307/9, 10 R, 120, 121; 200/61.45 R, 61.52; 340/52 H; 180/279, 283

[56] References Cited

U.S. PATENT DOCUMENTS

| | | | |
|---|---|---|---|
| 2,304,608 | 12/1942 | Smythe . | |
| 3,406,774 | 10/1968 | Lacey | 180/179 |
| 3,466,409 | 9/1969 | Pernet | 180/279 X |
| 3,712,405 | 1/1973 | Dillmann | 180/283 X |
| 3,882,449 | 5/1975 | Bouchard et al. | 200/61.45 R X |
| 3,962,693 | 6/1976 | Schamblin | 200/61.45 X |
| 4,000,408 | 12/1976 | McCartney | 307/103 P |
| 4,337,402 | 6/1982 | Nowakowski | 200/61.45 R X |
| 4,345,124 | 8/1982 | Abbin, Jr. et al. | 200/61.45 R X |
| 4,390,922 | 6/1983 | Pelliccia | 200/61.45 R X |

*Primary Examiner*—A. D. Pellinen
*Assistant Examiner*—Derek S. Jennings
*Attorney, Agent, or Firm*—Laurence R. Brown

[57] ABSTRACT

A safety device for interrupting the current to the electrical system of a motor vehicle comprises a special switch for opening the electrical circuit of a motor vehicle. This switch includes a weight housed in a breakable tube which is operably released on impact to open the circuit to the battery and to the ignition to prevent post-collision fires.

8 Claims, 4 Drawing Figures

POST-COLLISION FIRE PREVENTION DEVICE

TECHNICAL FIELD

This invention relates to automobile wiring systems and more particularly it relates to systems for disconnecting live electrical wires which could ignite a fire after a collision.

BACKGROUND ART

Fire prevention devices for interrupting the electrical circuit in a motor vehicle on impact are known in the prior art. These devices include a variety of switching mechanisms. For example, Pernet—U.S. Pat. No. 3,466,409—shows a ball and spring circuit breaker; McCartney—U.S. Pat. No. 4,000,408—shows a cam and spring mechanism; Lacey—U.S. Pat. No. 3,406,774—shows spring loaded switches; Smythe—U.S. Pat. No. 2,304,608—shows a bridge disk and spring mechanism; Rossel et al.—U.S. Pat. No. 4,308,438—show a ball and socket rocker mechanism.

It is a problem with all these prior art systems, however, to carefully control the switching system to operate only at a predetermined impact, which comes from a collision of significant enough impact force to cause danger of fire.

An object of this invention therefore is to provide a certain and sure metering of impact magnitude in a fire prevention safety switching system for an automobile.

SUMMARY OF THE INVENTION

A minor automobile collision can result in a serious fire. Sparks from fractured wires and disconnected spark plug wires can ignite spilled fuel. A simple easy to install safety device can reduce post-collision fires. My safety device is characterized by a weight operably released on impact from a tube breakable upon impact to open the electrical circuit to the battery and ignition switch. A main switch is connected to the negative post of the battery and to the battery ground cable. A secondary switch is connected from the ignition switch of the gasoline engine to the coil. Upon impact, the weight shatters the breakable tube and falls, opening the main switch and the secondary switch. Opening both switches interrupts the battery circuit and ignition circuit. Disconnecting the electrical system, in this manner, prevents sparks from fractured wires and loose spark plug wires from igniting fuel, thereby reducing the chances of a post-collision fire.

It is a feature of this invention to provide a safety device for fire prevention in motor vehicles characterized by a switching system activated by a weight operably released upon impact from a breakable tube to cut off the electrical circuit of a motor vehicle.

It is a further feature of this invention to provide a safety device that cuts off the electrical circuit to both the battery and the ignition.

It is a further feature of this invention to provide a safety device to prevent post-collision fires in motor vehicles that operates accurately upon an impact exceeding a predetermined magnitude.

PREFERRED EMBODIMENT OF THE INVENTION

Figure 1:
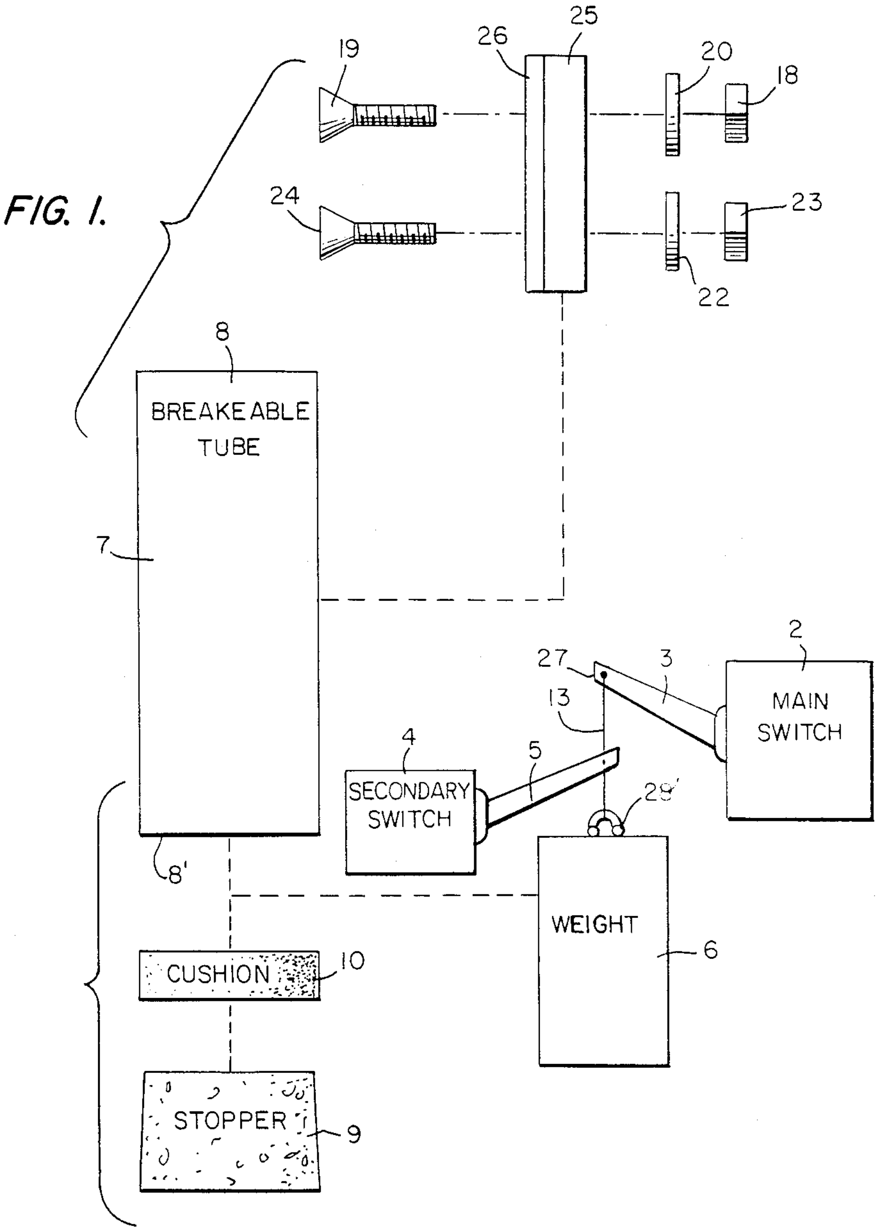
FIG. 1 is a disassembled exploded diagrammatical view of the switch activating system.

The safety device includes a switching system 1, (FIG. 2) which is connected to the battery and the ignition switch of a motor vehicle. The various switching system elements are shown in FIG. 1. The switching system is activated by a weight 6 operably released from a breakable tube 7 upon impact of the motor vehicle with an object. The breakable tube 7 has a top opening 8 and a base opening 8'. The base opening 8' may be sealed with a stopper 9. A foam pad cushion 10 and oil sufficient to cover the weight 6 is disposed about the weight 6 in the tube 7 crevice 11 to act as a buffer during normal operation of a motor vehicle. The weight 6 is suspended under the hood of a motor vehicle. A connection 13, such as nylon cord, may be fastened to the loop 28 of the weight 6 and the opening 27 of the lever arm 3 of the main switch 2. The lever arm 3 of the main switch 2 is positioned above the top opening 8 of the breakable tube 7. The lever arm 5 of the secondary switch 4 is positioned above the top opening 8 of the breakable tube 7 and below the lever arm 3 of the main switch 2. Upon impact of the motor vehicle with an object of a force above the threshold level, the breakable tube 7 is shattered by the weight 6. A four ounce steel cylindrical weight 1.5 inches (3.8 cm) long×25/32 inch (2 cm) diameter has been found to shatter a 0.052–0.058 inch (0.12 cm) wall thickness glass tube of one inch (2.5 cm) inner diameter upon impact at a car speed of 7–10 m.p.h. The weight 6 is released from the breakable tube 7 and the weight 6 pulls down the lever arm 3 of the main switch 2. The lever arm 3 of the main switch 2 is pulled down and encounters and pulls down the lever arm 5 of the secondary switch. This opens both the battery and ignition circuits and prevents sparks from fractured wires and disconnected spark plugs from igniting any spilled fuel, such as may come from a broken carburetor or fuel line.

Figure 2:
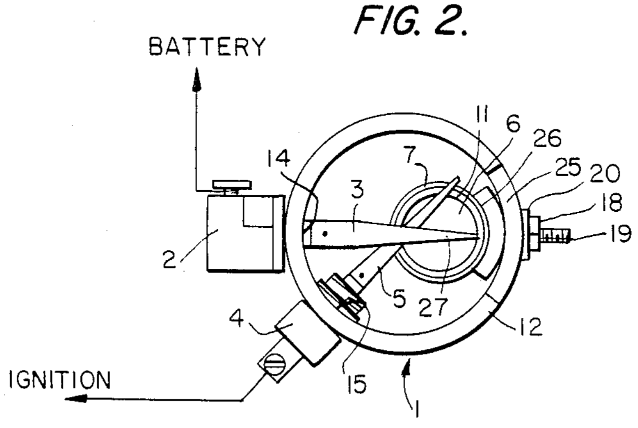
FIG. 2 is a top view of a housing incorporating the switch activating system.
Figure 3:
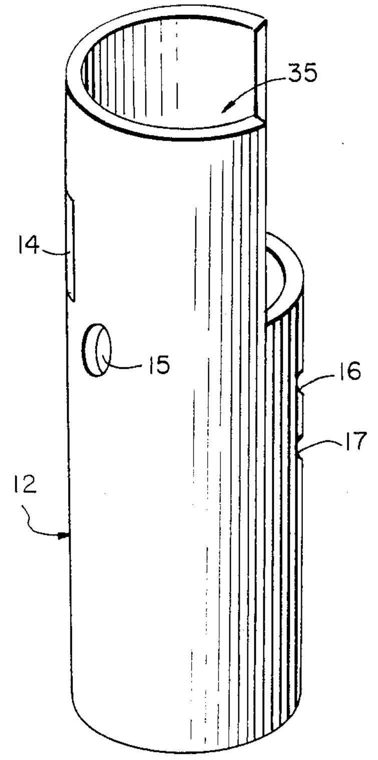
FIG. 3 is a side perspective view of the switch assembly housing member.
Figure 4:
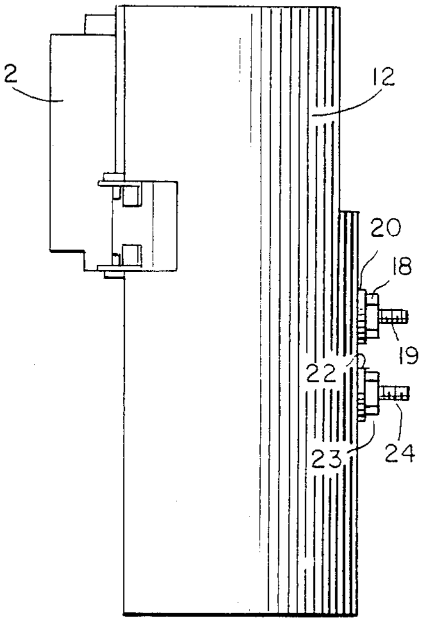
FIG. 4 is an elevation view of the switch housing assembly.

The switching system 1 may be housed in a receptacle 12 as shown in FIGS. 2, 3 and 4. The receptacle 12 includes a conduit for mounting the breakable tube 7 and openings 14 and 15 for positioning the main switch 2 and the secondary switch 4. The lever arm 5 of the secondary switch 4 is positioned in opening 15. The lever arm 3 of the main switch 2 is positioned in opening 14. The breakable tube 7 is secured in the receptacle 12 by attachment of the breakable tube 7 to an insert 25 by fastening means such as an adhesive bond at surface 26. Insert 25 is attached to the receptacle 12 by bolts 19 and 24 passing through insert 25 and openings 16 and 17 and fastened with washers 20 and 22 and nuts 18 and 23. Bolts 19 and 24, and nuts 20 and 22 may also be used to mount the receptacle 12 to the frame of the motor vehicle.

Once it is determined a post collision fire is no longer a concern, the electrical system of the motor vehicle can readily be restored by removing the weight to release the tension of the weight 6 on the lever arm 3 of the main switch 2. Lever arm 3 of the main switch 2 and lever arm 5 of the secondary switch 4 may then be raised to the normal operating position which closes the battery-ground circuit and the ignition circuit restoring the electrical system to the motor vehicle. The opening 35 in the housing 12 permits the switches to be manually operated. The switches may be spring loaded into the on position so that the removal of the weight restores the switch, or they may be bistable, so that they need be manually reset.

The novel features believed to be descriptive of the nature and spirit of the invention are defined with particularity in the claims.

I claim:

1. A safety device for switching off the electrical system of a motor vehicle upon impact of the motor vehicle with an object by connecting a switching system to interrupt the electrical system to reduce post-collision fires by preventing sparks from igniting the fuel, comprising in combination, switching means for opening the electrical system of the motor vehicle, a switch activating system connected to said switching means including a weight housed in a breakable tube, said weight operably releasable upon impact to fall and thereby activate said switching means thereby disconnecting the electrical system of the motor vehicle to prevent sparks from the electrical system from igniting fuel, wherein said breakable tube includes a top opening and a base opening, said base opening including a stopper for sealing said opening, said breakable tube provided with a buffering system including a cushion positioned closely adjacent to said stopper and oil covering said weight in said breakable tube to reduce shock during normal operation of the motor vehicle.

2. A safety device as set forth in claim 1 wherein the electrical system is connected to the battery and said switching means includes a switch connected to disconnect the battery from the electrical system.

3. A safety device as set forth in claim 2 wherein said switch includes a lever arm for connecting said weight to said switch activating system, said lever arm being so constructed and so arranged that said switching means is activated by the weight when operably released from a shattered tube by pulling on said lever arm of said main switch thereby interrupting the electrical system.

4. A safety device as set forth in claim 3 wherein the electrical system comprises an ignition system and said switching means includes a secondary switch operable by said weight to disconnect the ignition system.

5. A safety device as set forth in claim 4 wherein said secondary switch includes a lever arm, said lever arm of said secondary switch being so constructed and arranged that activation of said main switch by said weight operably released from said breakable tube pulls down the lever arm of said secondary switch thereby opening the circuit to the ignition system of the motor vehicle to prevent sparks from disconnected spark plug wires from igniting fuel.

6. A safety device as set forth in claim 1 wherein said switching means for opening the electrical system of the motor vehicle is assembled in a receptacle, said receptacle enclosing said switch activating system, said receptacle providing a means for mounting said switching means, and said receptacle providing a means for securing said safety device to the motor vehicle.

7. A safety device as defined in claim 1 with the weight comprising a cylindrical steel weight mounted in the breakable tube which comprises a cylindrical glass tube.

8. A safety device as defined in claim 7 with the cylindrical weight being approximately one and one-half inches (3.8 cm) long and slightly less than one inch (2.5 cm) in diameter, and the glass tube having an inner diameter slightly greater than that of said weight and a wall thickness in the order of 0.05 inch (0.12 cm).

* * * * *